UNITED STATES PATENT OFFICE.

EDWARD BEANES, OF HAVANA, CUBA.

IMPROVEMENT IN THE REFINING AND MANUFACTURE OF SUGAR.

Specification forming part of Letters Patent No. 36,988, dated November 25, 1862.

*To all whom it may concern:*

Be it known that I, EDWARD BEANES, of Havana, in the Island of Cuba, have invented a new and useful Improvement in the Manufacture and Refining of Sugar; and I do hereby declare that the following is a full, clear, and exact description of the same.

In the process of sugar-refining, after the first crop of crystals have been obtained from the clarified and decolored sirups of raw sugar, the mother-liquor is frequently found to be acid, such condition being caused by the development of saccharic acid, ($C_6H_4HO$.) Instead of using lime-water or milk of lime to neutralize this acid, my invention consists in the use of liquid ammonia for that purpose. The quantity used will depend upon the amount of acid developed, and should be sufficient to keep the liquor or sirup neutral, and thereby prevent the formation of uncrystallized sugar, and the mode of using it is the same as that heretofore practiced with lime-water and milk of lime. The advantage resulting from the use of the liquid ammonia over the use of lime-water or milk of lime consists in its having a volatile base.

The invention is also applicable in the manufacture of sugar from molasses, the liquid ammonia being introduced in sufficient quantity among the molasses and the effect being the same as in the process of refining sugar.

What I claim as my invention, and desire to secure by Letters Patent, is—

The use of ammonia for neutralizing the acids developed in the manufacture and refining of sugar, substantially as herein described.

EDW. BEANES.

Witnesses:
TIMOTHY SHINE,
M. S. PARTRIDGE.